US012669719B2

(12) United States Patent (10) Patent No.: US 12,669,719 B2
Ye et al. (45) Date of Patent: Jun. 30, 2026

(54) THREE-DIMENSIONAL DISPLAY DEVICE

(71) Applicant: WUHAN CHINA STAR OPTOELECTRONICS TECHNOLOGY CO., LTD., Wuhan (CN)

(72) Inventors: Xinlin Ye, Wuhan (CN); Guiyang Zhang, Wuhan (CN); Rui He, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 567 days.

(21) Appl. No.: 18/012,183

(22) PCT Filed: Nov. 23, 2022

(86) PCT No.: PCT/CN2022/133644
§ 371 (c)(1),
(2) Date: Dec. 21, 2022

(87) PCT Pub. No.: WO2024/092897
PCT Pub. Date: May 10, 2024

(65) Prior Publication Data
US 2024/0241390 A1 Jul. 18, 2024

(30) Foreign Application Priority Data
Nov. 3, 2022 (CN) .......................... 202211368611.2

(51) Int. Cl.
*G02B 30/56* (2020.01)
(52) U.S. Cl.
CPC .................................... *G02B 30/56* (2020.01)

(58) Field of Classification Search
CPC .......... G02B 30/56; G02B 5/12; G02B 27/10; G02B 30/20; G02B 30/25; G02B 27/1066; H04N 13/30
See application file for complete search history.

(56) References Cited

U.S. PATENT DOCUMENTS

2006/0109753 A1* 5/2006 Fergason ............. H04N 13/398
369/30.01
2018/0259810 A1 9/2018 Numata et al.
(Continued)

FOREIGN PATENT DOCUMENTS

CN 1928699 A 3/2007
CN 110189660 A 8/2019
(Continued)

OTHER PUBLICATIONS

Japanese Office Action issued in corresponding Japanese Patent Application No. 特願2022-573364 dated Dec. 16, 2024, pp. 1-5.
(Continued)

*Primary Examiner* — Bumsuk Won
*Assistant Examiner* — Ray Alexander Dean
(74) *Attorney, Agent, or Firm* — PV IP PC; Christopher S. Ruprecht; Wei Te Chung

(57) ABSTRACT

A three-dimensional display device includes a first display module to form a first floating image and a second display module to form a second floating image, and the first floating image and the second floating image partially overlap. A trompe l'oeil effect of the first floating image and the second floating image being fused to form a three-dimensional image is generated when viewed by human eyes, and three-dimensional displays can be realized.

20 Claims, 4 Drawing Sheets

(56)                 References Cited

U.S. PATENT DOCUMENTS

| | | | | |
|---|---|---|---|---|
| 2019/0285904 A1* | 9/2019 | Kim | .................. | G02B 30/56 |
| 2022/0187618 A1* | 6/2022 | Kusafuka | ............... | H04N 13/31 |

FOREIGN PATENT DOCUMENTS

| | | | | |
|---|---|---|---|---|
| CN | 211857164 U | 11/2020 | | |
| CN | 114002861 A | 2/2022 | | |
| CN | 115061287 A | 9/2022 | | |
| JP | 2002271820 A | 9/2002 | | |
| JP | 2012048002 A | 3/2012 | | |
| JP | 2018151465 A * | 9/2018 | .......... | G09G 3/3648 |
| JP | 2021110849 A | 8/2021 | | |
| KR | 101960192 B1 | 3/2019 | | |

OTHER PUBLICATIONS

International Search Report in International application No. PCT/CN2022/133644,mailed on Jul. 12, 2023.
Written Opinion of the International Search Authority in International application No. PCT/CN2022/133644,mailed on Jul. 12, 2023.
Korean Office Action issued in corresponding Korean Patent Application No. 10-2023-7037666 dated Apr. 15, 2025, pp. 1-5.
Chinese Office Action issued in corresponding Chinese Patent Application No. 202211368611.2 dated Sep. 26, 2025, pp. 1-6.
Eurasian Office Action issued in corresponding Eurasian Patent Application No. 202391926 dated Sep. 8, 2025, pp. 1-2.

* cited by examiner

THREE-DIMENSIONAL DISPLAY DEVICE

CROSS-REFERENCE TO RELATED APPLICATIONS

This patent application claims priority to International Patent Application No. PCT/CN2022/133644, filed on Nov. 23, 2022, which claims the benefit and priority of Chinese Patent Application No. 202211368611.2, filed with the China National Intellectual Property Administration on Nov. 3, 2022, the disclosures of which are incorporated herein by reference.

FIELD OF INVENTION

The present disclosure relates to the field of display technologies, and more particularly, to a three-dimensional display device.

BACKGROUND OF INVENTION

With rapid development of an era of 5th generation wireless systems (5G), a concept of "metaverse" will be an important interaction method in the next generation of high-speed information age. Virtual reality (VR), augmented reality (AR), and mixed reality (MR) technologies can realize virtual and reality interaction by wearable devices, and as an important component of many interactive devices, display devices have become indispensable electronic devices for communication, interaction, learning, entertainment, and shopping. Among them, three-dimensional (3D) display technologies will serve as an important window for the next generation of display technologies.

However, current 3D display technologies have not yet developed a display method with excellent performances in all aspects, and have not yet achieved a very perfect display effect. The 3D display technologies still need to be vigorously researched and developed.

Technical problem: an embodiment of the present disclosure provides a three-dimensional (3D) display device, which provides a 3D display solution to solve technical problems in current 3D display technologies, which have not yet developed a display method with excellent performances in all aspects and have not yet achieved a very perfect display effect.

SUMMARY OF INVENTION

An embodiment of the present disclosure provides a three-dimensional display device, which includes:

a first display module including a first display light source, a first retroreflective component, and a first light splitting component abutted to each other in sequence by end-to-end, wherein, display light emitted by the first display light source exits the first light splitting component and forms a first floating image; and a second display module including a second display light source, a second retroreflective component, and a second light splitting component abutted to each other in sequence by end-to-end, wherein, display light emitted by the second display light source exits the second light splitting component and forms a second floating image; wherein, one end of the first light splitting component abuts one end of the second light splitting component, an included angle between a plane where the first light splitting component is located and a plane where the second light splitting component is located is greater than 0 and less than or equal to 90 degrees, and the first floating image and the second floating image partially overlap.

Optionally, in some embodiments of the present disclosure, the first display light source includes a first display panel, and the second display light source includes a second display panel.

Optionally, in some embodiments of the present disclosure, a first end of the first display panel abuts a first end of the first light splitting component, a first end of the second retroreflective component abuts a first end of the second light splitting component, and the first end of the first light splitting component abuts the first end of the second light splitting component.

Optionally, in some embodiments of the present disclosure, display light emitted by the first display panel is converted by the first light splitting component, the first retroreflective component, the first light splitting component, and the second light splitting component sequentially to form the first floating image; and display light emitted by the second display panel is converted by the second light splitting component, the second retroreflective component, and the second light splitting component sequentially to form the second floating image.

Optionally, in some embodiments of the present disclosure, a length of the first light splitting component is greater than or equal to a length of the first retroreflective component, and the length of the first retroreflective component is greater than or equal to a length of the first display panel; and a length of the second light splitting component is greater than or equal to a length of the second retroreflective component, and the length of the second retroreflective component is greater than or equal to a length of the second display panel.

Optionally, in some embodiments of the present disclosure, a second end of the first display panel abuts a first end of the first retroreflective component, a second end of the first retroreflective component abuts a second end of the first light splitting component, and the first display panel is perpendicular to the first retroreflective component; and a second end of the second retroreflective component abuts a first end of the second display panel, a second end of the second display panel abuts a second end of the second light splitting component, and the second display panel is perpendicular to the second retroreflective component.

Optionally, in some embodiments of the present disclosure, the first display panel is parallel to the second retroreflective component.

Optionally, in some embodiments of the present disclosure, both the first light splitting component and the second light splitting component are beam-splitter mirrors, and both the first retroreflective component and the second retroreflective component are retroreflective films.

Optionally, in some embodiments of the present disclosure, both the first light splitting component and the second light splitting component are beam-splitter mirrors, and both the first retroreflective component and the second retroreflective component are retroreflective films.

Optionally, in some embodiments of the present disclosure, both the first light splitting component and the second light splitting component are reflective polarizers; the first retroreflective component includes a first retroreflective film and a first quarter-wave plate, and the first quarter-wave plate is disposed on one side of the first retroreflective film adjacent to the first light splitting component; and the second retroreflective component includes a second retroreflective film and a second quarter-wave plate, and the second quarter-wave plate is disposed on one side of the second retroreflective film adjacent to the second light splitting component.

Optionally, in some embodiments of the present disclosure, both the first light splitting component and the second light splitting component are reflective polarizers; the first retroreflective component includes a first retroreflective film and a first quarter-wave plate, and the first quarter-wave plate is disposed on one side of the first retroreflective film adjacent to the first light splitting component; and the second retroreflective component includes a second retroreflective film and a second quarter-wave plate, and the second quarter-wave plate is disposed on one side of the second retroreflective film adjacent to the second light splitting component.

Optionally, in some embodiments of the present disclosure, the first display light source includes a first display panel and a first flat reflector, and the first display panel, the first flat reflector, the first light splitting component, and the first retroreflective component abut to each other in sequence by end-to-end; and the second display light source includes a second display panel and a second flat reflector, and the second flat reflector, the second display panel, the second retroreflective component, and the second light splitting component abut to each other in sequence by end-to-end.

Optionally, in some embodiments of the present disclosure, a first end of the first flat reflector abuts a first end of the first light splitting component, a first end of the second retroreflective component abuts a first end of the second light splitting component, and the first end of the first light splitting component abuts the first end of the second light splitting component.

Optionally, in some embodiments of the present disclosure, display light emitted by the first display panel is converted by the first flat reflector, the first light splitting component, the first retroreflective component, the first light splitting component, and the second light splitting component sequentially to form the first floating image; and display light emitted by the second display panel is converted by the second flat reflector, the second light splitting component, the second retroreflective component, and the second light splitting component sequentially to form the second floating image.

Optionally, in some embodiments of the present disclosure, a length of the first light splitting component is greater than or equal to a length of the first retroreflective component, the length of the first retroreflective component is greater than or equal to a length of the first flat reflector, and the length of the first flat reflector is greater than or equal to a length of the first display panel; and a length of the second light splitting component is greater than or equal to a length of the second retroreflective component, the length of the second retroreflective component is greater than or equal to a length of the second flat reflector, and the length of the second flat reflector is greater than or equal to a length of the second display panel.

Optionally, in some embodiments of the present disclosure, the first retroreflective component is parallel to the first display panel, the second retroreflective component is parallel to the second display panel, and the first retroreflective component is perpendicular to the second retroreflective component.

Optionally, in some embodiments of the present disclosure, a second end of the first flat reflector abuts a first end of the first display panel;

the first display module further includes a first sub-rotating part and a second sub-rotating part, the first sub-rotating part is rotationally connected to the second end of the first flat reflector, and the second sub-rotating part is rotationally connected to the first end of the first display panel;

the first display module has a first state and a second state;

in the first state, the first flat reflector is located at a first position, and the first display panel is located at a second position;

in the second state, the first flat reflector is located at a third position, and the first display panel is located at a fourth position; and an included angle between the fourth position and the second position is twice an included angle between the third position and the first position.

Optionally, in some embodiments of the present disclosure, a second end of the first flat reflector abuts a first end of the first display panel;

the first display module further includes a first sub-rotating part and a second sub-rotating part, the first sub-rotating part is rotationally connected to the second end of the first flat reflector, and the second sub-rotating part is rotationally connected to the first end of the first display panel;

the first display module has a first state and a second state;

in the first state, the first flat reflector is located at a first position, and the first display panel is located at a second position;

in the second state, the first flat reflector is located at a third position, and the first display panel is located at a fourth position; and an included angle between the fourth position and the second position is twice an included angle between the third position and the first position.

Optionally, in some embodiments of the present disclosure, a second end of the second display panel abuts a first end of the second flat reflector;

the second display module further includes a third sub-rotating part and a fourth sub-rotating part, the third sub-rotating part is rotationally connected to the first end of the second flat reflector, and the fourth sub-rotating part is rotationally connected to the second end of the second display panel;

the second display module has a third state and a fourth state;

in the third state, the second flat reflector is located at a fifth position, and the second display panel is located at a sixth position;

in the fourth state, the second flat reflector is located at a seventh position, and the second display panel is located at an eighth position; and an included angle between the eighth position and the sixth position is twice an included angle between the seventh position and the fifth position.

Optionally, in some embodiments of the present disclosure, a second end of the second display panel abuts a first end of the second flat reflector;

the second display module further includes a third sub-rotating part and a fourth sub-rotating part, the third sub-rotating part is rotationally connected to the first end of the second flat reflector, and the fourth sub-rotating part is rotationally connected to the second end of the second display panel;

the second display module has a third state and a fourth state;

in the third state, the second flat reflector is located at a fifth position, and the second display panel is located at a sixth position;

in the fourth state, the second flat reflector is located at a seventh position, and the second display panel is located at an eighth position; and an included angle between the eighth position and the sixth position is twice an included angle between the seventh position and the fifth position.

Beneficial effect: the present disclosure provides the three-dimensional display device. The three-dimensional display device includes: the first display module including the first display light source, the first retroreflective component, and the first light splitting component abutted to each other in sequence by end-to-end, wherein, the display light emitted by the first display light source exits the first light splitting component and forms the first floating image; and the second display module including the second display light source, the second retroreflective component, and the second light splitting component abutted to each other in sequence by end-to-end, wherein, the display light emitted by the second display light source exits the second light splitting component and forms the second floating image. Wherein, one end of the first light splitting component abuts one end of the second light splitting component, the included angle between the plane where the first light splitting component is located and the plane where the second light splitting component is located is greater than 0 and less than or equal to 90 degrees, and the first floating image and the second floating image partially overlap.

In the present disclosure, the display light emitted by the first display light source exits the first light splitting component and forms the first floating image, the display light emitted by the second display light source exits the second light splitting component and forms the second floating image, and the first floating image and the second floating image partially overlap. Therefore, a trompe l'oeil effect of the first floating image and the second floating image being fused to form a three-dimensional image is generated when viewed by human eyes, thereby realizing three-dimensional displays.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION

Figure 1:
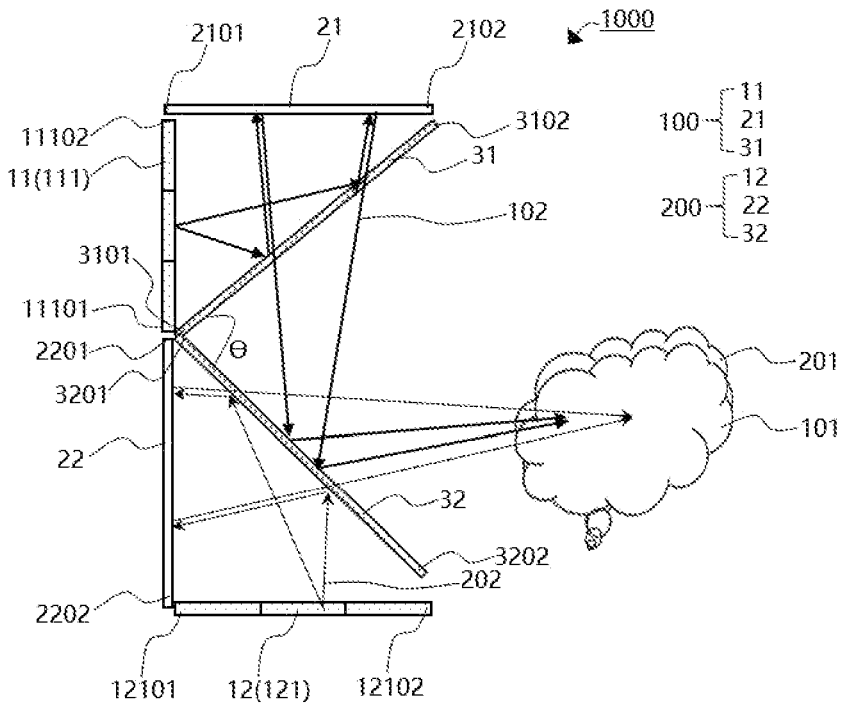
FIG. 1 is a schematic cross-sectional diagram of a three-dimensional display device according to embodiment 1 of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure. In addition, it should be understood that the specific embodiments described herein are only used to illustrate and explain the disclosure, and are not used to limit the disclosure. In the present disclosure, in the case of no explanation to the contrary, the orientation words used such as "on" and "under" usually refer to upper and lower directions of the device in actual use or working state, and specifically the directions in the drawings; and "inside" and "outside" refer to the outline of the device.

An embodiment of the present disclosure provides a three-dimensional display device. The three-dimensional display device includes: a first display module including a first display light source, a first retroreflective component, and a first light splitting component abutted to each other in sequence by end-to-end, wherein, display light emitted by the first display light source exits the first light splitting component and forms a first floating image; and a second display module including a second display light source, a second retroreflective component, and a second light splitting component abutted to each other in sequence by end-to-end, wherein, display light emitted by the second display light source exits the second light splitting component and forms a second floating image. Wherein, one end of the first light splitting component abuts one end of the second light splitting component, an included angle between a plane where the first light splitting component is located and a plane where the second light splitting component is located is greater than 0 and less than or equal to 90 degrees, and the first floating image and the second floating image partially overlap.

It will be described in detail in the following embodiments. It should be noted that an order of description in the following embodiments is not meant to limit a preferred order of the embodiments.

Embodiment 1

Referring to FIG. 1, FIG. 1 is a schematic cross-sectional diagram of a three-dimensional display device according to embodiment 1 of the present disclosure.

An embodiment of the present disclosure provides the three-dimensional display device 1000. The three-dimensional display device 1000 includes a first display module 100 and a second display module 200. The first display module 100 includes a first display light source 11, a first retroreflective component 21, and a first light splitting component 31 abutted to each other in sequence by end-to-end. Wherein, display light emitted by the first display light source 11 exits the first light splitting component 31 and forms a first floating image 101. The second display module 200 includes a second display light source 12, a second retroreflective component 122, and a second light splitting component 32 abutted to each other in sequence by end-to-end. Wherein, display light emitted by the second display light source 12 exits the second light splitting component 32 and forms a second floating image 201. Wherein, one end of the first light splitting component 31 abuts one end of the second light splitting component 32, an included angle θ between a plane where the first light splitting component 31 is located and a plane where the second light splitting component 32 is located is greater than 0 and less than or equal to 90 degrees, and the first floating image 101 and the second floating image 201 partially overlap.

Specifically, the first display module 100 includes the first display light source 11, the first retroreflective component 21, and the first light splitting component 31. The first display light source 11, the first retroreflective component 21, and the first light splitting component 31 abut to each other in sequence by end-to-end. As shown in FIG. 1, in the cross-sectional diagram, the first display light source 11, the first retroreflective component 21, and the first light splitting component 31 abut to each other in sequence by end-to-end and constitute a triangular or nearly triangular structure.

Specifically, the display light emitted by the first display light source 11 is optically converted by the first retroreflective component 21 and the first light splitting component 31 and exits the first light splitting component 31 to form the first floating image 101.

Specifically, the display light emitted by the second display light source 12 is optically converted by the second retroreflective component 22 and the second light splitting component 32 and exits the second light splitting component 32 to form the second floating image 201.

Specifically, the first floating image 101 and the second floating image 201 are located on a same side of the three-dimensional display device 1000. In FIG. 1, the first floating image 101 and the second floating image 201 are formed on the same side of the three-dimensional display device 1000. For example, the first floating image 101 and the second floating image 201 are located within an included range between a plane where the first light splitting component 31 is located and a plane where the second light splitting component 32 is located, but are not limited to this.

Specifically, the included angle θ between the plane where the first light splitting component 31 is located and the plane where the second light splitting component 32 is located is greater than 0 and less than or equal to 90 degrees. When the included angle θ is larger, an image-forming space will be larger.

Specifically, in the embodiments of the present disclosure, an abutting setting refers to an adjacent, close, or connected setting.

Specifically, the first floating image 101 and the second floating image 201 partially overlap. When viewed by human eyes, one of the first floating image 101 and the second floating image 201 is located at a front end (closer to the human eyes), another one is located at a rear end (farther from the human eyes), and color depths or/and brightness of the first floating image 101 and the second floating image 201 are different, so a trompe l'oeil effect will be generated when viewed by the human eyes, the first floating image 101 and the second floating image 201 will be superimposed on two transparent screens with different brightness, and a viewer can perceive three-dimensional images. If an image at the front end is brighter, a fused image will appear closer to the viewer, and if an image at the rear end is brighter, the fused image will appear farther to the viewer. Using display effects with different visual distances from the viewer and display depths formed by fusing different color depths or/and brightness of the first floating image 101 and the second floating image 201, a three-dimensional image is formed.

In the embodiment, the display light emitted by the first display light source 11 exits the first light splitting component 31 and forms the first floating image 101, the display light emitted by the second display light source 12 exits the second light splitting component 32 and forms the second floating image 201, and the first floating image 101 and the second floating image 201 partially overlap. Therefore, the first floating image and the second floating image are fused to form the three-dimensional image when viewed by human eyes, thereby realizing three-dimensional displays.

In some embodiments, the first display light source 11 includes a first display panel 111, and the second display light source 12 includes a second display panel 121.

Specifically, as shown in FIG. 1, the first display panel 111 is used as the first display light source 11 to emit the display light of the first display module 100, and the second display panel 121 is used as the second display light source 12 to emit the display light of the second display module 200. In subsequent or other implementation situations, the first display light source 11 may include the first display panel 111 and other component structures, and the second display light source 12 may include the second display panel 121 and other component structures.

In some embodiments, a first end 11101 of the first display panel abuts a first end 3101 of the first light splitting component, a first end 2201 of the second retroreflective component abuts a first end 3201 of the second light splitting component, and the first end 3101 of the first light splitting component abuts the first end 3201 of the second light splitting component.

Specifically, the first end 3101 of the first light splitting component abutting the first end 3201 of the second light splitting component is beneficial to the fusion of the first floating image 101 and the second floating image 201 to form the three-dimensional image.

In some embodiments, the display light emitted by the first display panel 111 is converted by the first light splitting component 31, the first retroreflective component 21, the first light splitting component 31, and the second light splitting component 32 sequentially to form the first floating image 101; and the display light emitted by the second display panel 121 is converted by the second light splitting component 32, the second retroreflective component 22, and the second light splitting component 32 sequentially to form the second floating image 201.

Specifically, as shown in FIG. 1, the first display light source 11 or the first display pane 1111 emits first display light 102, and the first display light 102 is reflected by the first light splitting component 31, reflected by the first retroreflective component 21, transmitted by the first light splitting component 31, and then reflected by the second light splitting component 32 to form the first floating image 101.

Specifically, as shown in FIG. 1, the second display light source 12 or the second display panel 121 emits second display light 202, and the second display light 202 is reflected by the second light splitting component 32, reflected by the second retroreflective component 22, and transmitted by the second light splitting component 32 to form the second floating image 201.

Specifically, the first retroreflective component 21 and the second retroreflective component 22 can reflect light incident on their surfaces back in an opposite direction of an original incident direction or a direction close to the original incident direction. The surfaces of the first retroreflective component 21 and the second retroreflective component 22 may be a microstructure having an array of triangular pyramids or cubic pyramids, and the light incident on the surfaces of the first retroreflective component 21 and the second retroreflective component 22 can be reflected back at a small divergence angle. The structures of the first retroreflective component 21 and the second retroreflective component 22 are not limited thereto.

Specifically, the first light splitting component 31 and the second light splitting component 32 can both reflect light and transmit light, and a ratio of transmitted light to reflected light can be preset or set according to film layer structures.

In some embodiments, a length of the first light splitting component 31 is greater than or equal to a length of the first retroreflective component 21, and the length of the first retroreflective component 21 is greater than or equal to a length of the first display panel 111; and a length of the second light splitting component 32 is greater than or equal to a length of the second retroreflective component 22, and the length of the second retroreflective component 22 is greater than or equal to a length of the second display panel 121.

Specifically, the length of the first retroreflective component 21 being greater than or equal to the length of the first display panel 111 can allow most or all the first display light 102 emitted by the first display panel 111 to be reflected by the first retroreflective component 21; and the length of the first light splitting component 31 being greater than or equal to the length of the first retroreflective component 21 can allow most or all the first display light 102 emitted by the first display panel 111 to be reflected or/and transmitted by the first light splitting component 31.

Specifically, the length of the second retroreflective component 22 being greater than or equal to the length of the second display panel 121 can allow most or all the second display light 202 emitted by the second display panel 121 to be reflected by the second retroreflective component 22; and the length of the second light splitting component 32 being greater than or equal to the length of the second retroreflective component 22 can allow most or all the second display light 202 emitted by the second display panel 121 to be reflected or/and transmitted by the second light splitting component 32.

In some embodiments, a second end 11102 of the first display panel abuts a first end 2101 of the first retroreflective component, a second end 2102 of the first retroreflective component abuts a second end 3102 of the first light splitting component, and the first display panel 111 is perpendicular to the first retroreflective component 21; and a second end 2202 of the second retroreflective component abuts a first end 12101 of the second display panel, a second end 12102 of the second display panel abuts a second end 3202 of the second light splitting component, and the second display panel 121 is perpendicular to the second retroreflective component 22.

Specifically, in a preferred embodiment, the first display panel 111 being perpendicular to the first retroreflective component 21 is beneficial to form the first floating image 101 with a high quality. In general, if an included angle between the first display panel 111 and the first retroreflective component 21 is greater than 90°, partial light emitted by the first display panel 111 will be lost and not enter the first retroreflective component 21, which greatly reduces light effect; and if the included angle between the first display panel 111 and the first retroreflective component 21 is less than 90°, the light emitted by the first display panel 111 will enter the first retroreflective component 21 before entering the first light splitting component 31, which will form more miscellaneous images. Similarly, the second display panel 121 being perpendicular to the second retroreflective component 22 is beneficial to form the second floating image 201 with a high quality. The first display panel 111 being perpendicular to the first retroreflective component 21 and the second display panel 121 being perpendicular to the second retroreflective component 22 are beneficial for the first floating image 101 and the second floating image 201 to be better fused into a 3D image with a high quality.

In some embodiments, the first display panel 111 is parallel to the second retroreflective component 22.

Specifically, in a preferred embodiment, the first display panel 111 being parallel to the second retroreflective component 22 is beneficial for the first floating image 101 and the second floating image 201 to be better fused into the 3D image.

In some embodiments, both the first light splitting component 31 and the second light splitting component 32 are beam-splitter mirrors, and both the first retroreflective component 21 and the second retroreflective component 22 are retroreflective films.

Specifically, both the first light splitting component 31 and the second light splitting component 32 are beam-splitter mirrors, and a structure of the beam-splitter mirrors may be coated glass, which is optical glass with surfaces coated by one or more layers of film. When a beam of light is projected onto the coated glass, the beam of light will be divided into two or more beams by reflection and transmission, and a structure of the beam-splitter mirrors is not limited to thereto.

Specifically, both the first retroreflective component 21 and the second retroreflective component 22 are retroreflective films. A structure of the retroreflective films may be a microstructure having an array of triangular pyramids or cubic pyramids on a substrate surface, and the structure of the retroreflective films is not limited thereto.

Embodiment 2

Figure 2:
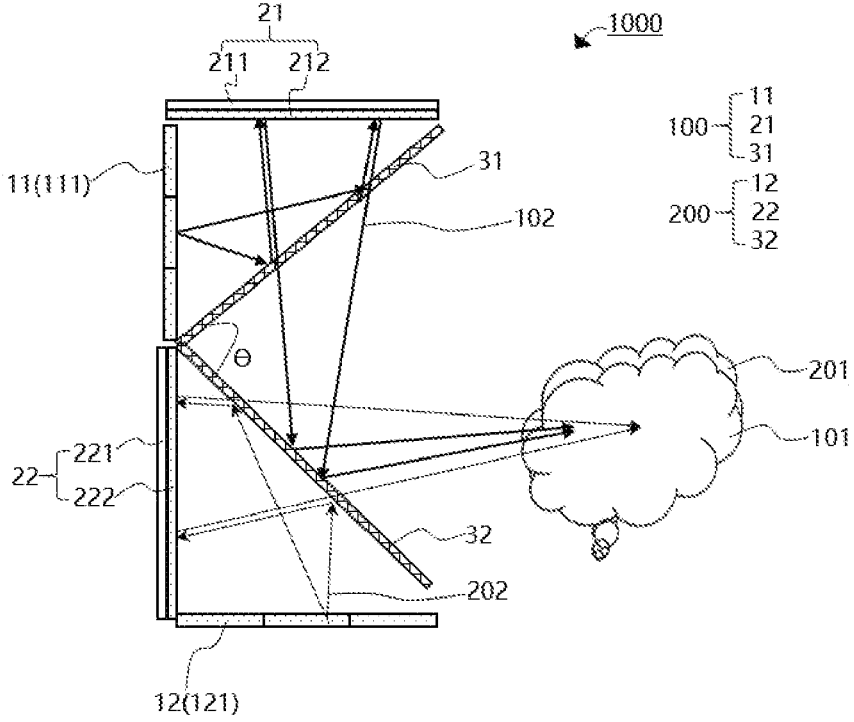
FIG. 2 is a schematic cross-sectional diagram of the three-dimensional display device according to embodiment 2 of the present disclosure.

Referring to FIG. 2, FIG. 2 is a schematic cross-sectional diagram of the three-dimensional display device according to embodiment 2 of the present disclosure.

The three-dimensional display device in this embodiment is same or similar to the three-dimensional display device 1000 in embodiment 1, and the similarities will not be repeated here, and only the differences will be described here.

In some embodiments, both the first light splitting component 31 and the second light splitting component 32 are reflective polarizers. The first retroreflective component 21 includes a first retroreflective film 211 and a first quarter-wave plate 212, and the first quarter-wave plate 212 is disposed on one side of the first retroreflective film 211 adjacent to the first light splitting component 31. The second retroreflective component 22 includes a second retroreflective film 221 and a second quarter-wave plate 222, and the second quarter-wave plate 222 is disposed on one side of the second retroreflective film 221 adjacent to the second light splitting component 32.

Specifically, the reflective polarizers can reflect light in a first polarization direction and transmit light in a second polarization direction, and the first polarization direction is perpendicular to the second polarization direction.

Specifically, the performance and structure of the first retroreflective film 211 and the second retroreflective film 221 are same as those of the retroreflective films in embodiment 1, and will not be repeated here.

Specifically, the first quarter-wave plate 212 is disposed on one side of the first retroreflective film 211 adjacent to the first light splitting component 31, so that light in the first polarization direction reflected by the first light splitting component 31 will pass the first quarter-wave plate 212, then be reflected by the first retroreflective film 211, and then pass the first quarter-wave plate 212 again. Therefore, the light in the first polarization direction is converted into light in the second polarization direction, and the light in the second polarization direction can transmit the first light splitting component 31.

Specifically, the second quarter-wave plate 222 is disposed on one side of the second retroreflective film 221 adjacent to the second light splitting component 32, so that light in the first polarization direction reflected by the second light splitting component 32 will pass the second quarter-wave plate 222, then be reflected by the second retroreflective film 221, and then pass the second quarter-wave plate 222 again. Therefore, the light in the first polarization direction is converted into light in the second polarization direction, and the light in the second polarization direction can transmit the second light splitting component 32.

Specifically, the polarization directions of the light reflected or transmitted by the first light splitting component 31 and the second light splitting component 32 may be the same or different.

Specifically, when the first display panel 111 and the second display panel 121 are liquid crystal display panels (TFT-LCDs) and surfaces of the liquid crystal display panels are provided with polarizers, or the first display panel 111 and the second display panel 121 are other types of display panels with polarizers installed on the surfaces, the first display panel 111 is matched with the first light splitting component 31, and a polarization direction of the first display light 102 emitted by the first display panel 111 is same as a polarization direction of reflected light of the first light splitting component 31. The first display light 102 emitted by the first display panel 111 is reflected to the first retroreflective component 21 by the first light splitting component 31 first, and at this time, no light will pass through the first light splitting component 31, and all the light from the first display pane 1111 is used to form the first floating image 101. Therefore, light utilization of the first display panel 111 can be increased, and the first display light 102 can be prevented from directly transmitting the first light splitting component 31 without being reflected by the first retroreflective component 21 and interfering with the first floating image 101, thereby improving the image-forming quality of the three-dimensional display device 1000. The light path and beneficial effects of the second display module 200 are same or similar to those of the first display module 100, and will not be repeated here.

Embodiment 3

Figure 3:
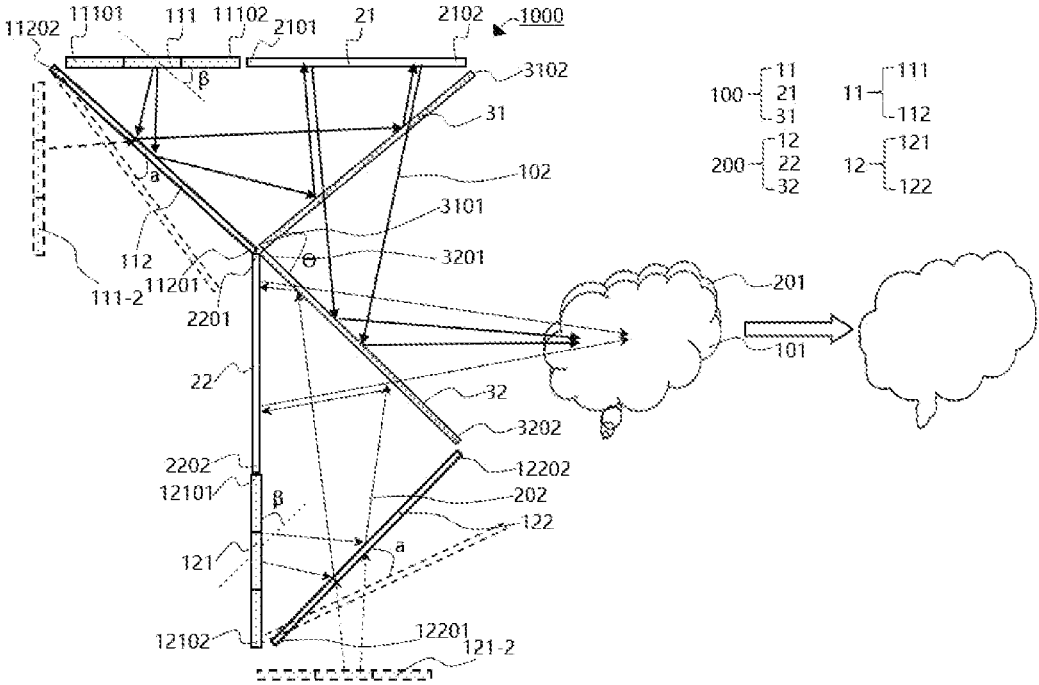
FIG. 3 is a schematic cross-sectional diagram of the three-dimensional display device according to embodiment 3 of the present disclosure.

Referring to FIG. 3, FIG. 3 is a schematic cross-sectional diagram of the three-dimensional display device according to embodiment 3 of the present disclosure.

The three-dimensional display device in this embodiment is similar to the three-dimensional display device 1000 in embodiments 1 and 2, and the similarities will not be repeated here, and only the differences will be described here.

In some embodiments, the first display light source 11 includes a first display panel 111 and a first flat reflector 112, and the first display panel 111, the first flat reflector 112, the first light splitting component 31, and the first retroreflective component 21 abut to each other in sequence by end-to-end. The second display light source 12 includes a second display panel 121 and a second flat reflector 122, and the second flat reflector 122, the second display panel 121, the second retroreflective component 22, and the second light splitting component 32 abut to each other in sequence by end-to-end.

Specifically, the first display light source 11 includes the first display panel 111 and the first flat reflector 112. The first display light 102 emitted by the first display panel 111 is reflected by the first flat reflector 112 first and then incident to other components.

Specifically, the second display light source 12 includes the second display panel 121 and the second flat reflector 122. The second display light 202 emitted by the second display panel 121 is reflected by the second flat reflector 122 first and then incident to other components.

In some embodiments, a first end 11201 of the first flat reflector abuts a first end 3101 of the first light splitting component, a first end 2201 of the second retroreflective component abuts a first end 3201 of the second light splitting component, and the first end 3101 of the first light splitting component abuts the first end 3201 of the second light splitting component.

Specifically, the first end 3101 of the first light splitting component abutting the first end 3201 of the second light splitting component is beneficial to the fusion of the first floating image 101 and the second floating image 201 to form the three-dimensional image.

In some embodiments, the display light emitted by the first display panel 111 is converted by the first flat reflector 112, the first light splitting component 31, the first retroreflective component 21, the first light splitting component 31, and the second light splitting component 32 sequentially to form the first floating image; and the display light emitted by the second display panel 121 is converted by the second flat reflector 122, the second light splitting component 32, the second retroreflective component 22, and the second light splitting component 32 sequentially to form the second floating image.

Specifically, the first display light 102 emitted by the first display panel 111 is reflected by the first flat reflector 112 first and then enters the first light splitting component 31. Subsequent optical paths and optical conversion processes of the first display light 102 are the same as those in the above-mentioned embodiments, and will not be repeated here. The first flat reflector 112 reflects the first display light 102 emitted by the first display panel 111, and as shown in FIG. 3, the first flat reflector 112 forms an image, which is equivalent to the first display panel 111 at a position 111-2.

Specifically, the second display light 202 emitted by the second display panel 121 is reflected by the second flat reflector 122 first and then enters the second light splitting component 32. Subsequent optical paths and optical conversion processes of the second display light 202 are the same as those in the above-mentioned embodiments, and will not be repeated here. The second flat reflector 122 reflects the second display light 202 emitted by the second display panel 121, and as shown in FIG. 3, the second flat reflector 122 forms an image, which is equivalent to the second display panel 121 at a position 121-2.

In this embodiment, by disposing the first flat reflector 112 and the second flat reflector 122, the first flat reflector 112 or/and the first display panel 111 can be preset to have a small rotation angle relative to the first retroreflective component 21, or the first flat reflector 112 or/and the first display panel 111 can have a small default angle relationship, which allows a position of the first floating image 101 to be greatly changed or migrated. Similarly, a position of the second floating image 201 can also be greatly changed or migrated, and is not repeated here. Therefore, the first floating image 101 and the second floating image 201 can achieve a greater display depth.

In some embodiments, a length of the first light splitting component 31 is greater than or equal to a length of the first retroreflective component 21, the length of the first retroreflective component 21 is greater than or equal to a length of the first flat reflector 112, and the length of the first flat reflector 112 is greater than or equal to a length of the first display panel 111; and a length of the second light splitting component 32 is greater than or equal to a length of the second retroreflective component 22, the length of the second retroreflective component 22 is greater than or equal to a length of the second flat reflector 122, and the length of the second flat reflector 122 is greater than or equal to a length of the second display panel 121.

Specifically, the length of the first flat reflector 112 being greater than or equal to the length of the first display panel 111 can allow the first flat reflector 112 to reflect all or most display light of the first display panel 111.

Specifically, the length of the second flat reflector 122 being greater than or equal to the length of the second display panel 121 can allow the second flat reflector 122 to reflect all or most display light of the second display panel 121.

In some embodiments, the first retroreflective component 21 is parallel to the first display panel 111, the second retroreflective component 22 is parallel to the second display panel 121, and the first retroreflective component 21 is perpendicular to the second retroreflective component 22.

Specifically, when the first retroreflective component 21 is parallel to the first display panel 111, the display light emitted by the first display panel 111 can be incident to the first retroreflective component 21 more efficiently or more, which is beneficial for forming the first floating image 101 with high quality.

Specifically, when the second retroreflective component 22 is parallel to the second display panel 121, the display light emitted by the second display panel 121 can be incident to the second retroreflective component 22 more efficiently or more, which is beneficial for forming the second floating image 201 with high quality.

Specifically, the first retroreflective component 21 being perpendicular to the second retroreflective component 22 is beneficial for the first floating image 101 and the second floating image 201 to be better fused into a 3D image with high quality.

Specifically, FIG. 3 shows that the second end 12102 of the second display panel abuts the first end 12201 of the second flat reflector, and the second end 12202 of the second flat reflector abuts the second end 3202 of the second light splitting component.

Embodiment 4

Figure 4:
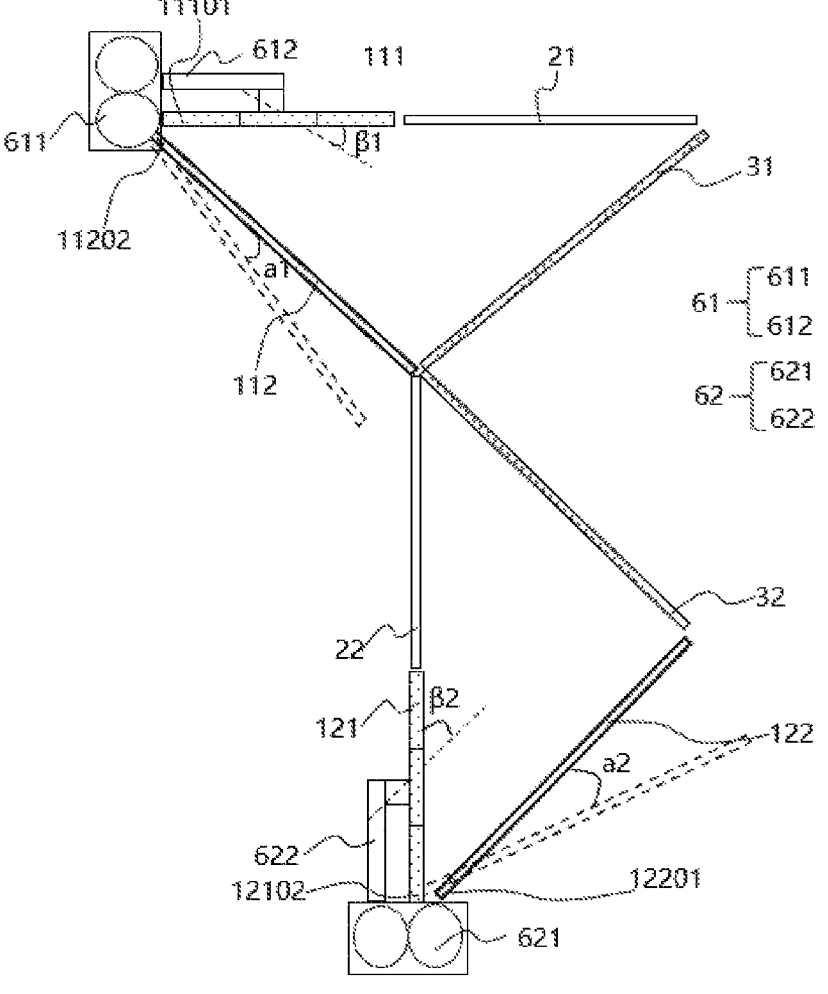
FIG. 4 is a schematic cross-sectional diagram of the three-dimensional display device according to embodiment 4 of the present disclosure.

Referring to FIG. 4, FIG. 4 is a schematic cross-sectional diagram of the three-dimensional display device according to embodiment 4 of the present disclosure. FIG. 4 is similar to FIG. 3, and a difference is that a first rotating part 61 and a second rotating part 62 are added.

The three-dimensional display device in this embodiment is similar to the three-dimensional display device 1000 in embodiment 3, and the similarities will not be repeated here, and only the differences will be described here.

Specifically, the first rotating part 61 includes a first sub-rotating part 611 and a second sub-rotating part 612. Specifically, the second rotating part 62 includes a third sub-rotating part 621 and a fourth sub-rotating part 622.

In some embodiments, a second end 11202 of the first flat reflector abuts a first end 11101 of the first display panel. The first display module 100 further includes a first sub-rotating part 611 and a second sub-rotating part 612, the first sub-rotating part 611 is rotationally connected to the second end 11202 of the first flat reflector, and the second sub-rotating part 612 is rotationally connected to the first end 11101 of the first display panel.

Specifically, the first sub-rotating part 611 and the second sub-rotating part 612 may be biaxial rotators or other rotating mechanical structures, which are not limited here.

Specifically, the first display panel 111 and the first flat reflector 112 can be rotated to adjust a relative positional relationship between the first floating image 101 and the second floating image 201, including adjusting the display depth, adjusting the display position, etc. Different display effects can be achieved by dynamically adjusting a display distance between the first floating image 101 and the second floating image 201 to change a state of image fusion.

In some embodiments, the first display module has a first state and a second state. In the first state, the first flat reflector 112 is located at a first position, and the first display panel 111 is located at a second position. In the second state, the first flat reflector 112 is located at a third position, and the first display panel 111 is located at a fourth position. An included angle between the fourth position and the second position is twice an included angle between the third position and the first position.

Specifically, the first flat reflector 112 and the first display panel 111 rotate in a same direction, the included angle between the fourth position and the second position is $\beta 1$, the included angle between the third position and the first position is $\alpha 1$, and $\beta 31$ is twice as large as $\alpha 1$.

Specifically, both the first flat reflector 112 and the first display panel 111 rotate clockwise or counterclockwise, and the rotation angle $\beta 1$ of the first display panel 111 is twice the rotation angle $\alpha 1$ of the first flat reflector 112, which can keep the size of the first floating image 101 unchanged and only change its position.

In some embodiments, a second end 12102 of the second display panel abuts a first end 12201 of the second flat reflector. The second display module 200 further includes a third sub-rotating part 621 and a fourth sub-rotating part 622, the third sub-rotating part 621 is rotationally connected to the first end 12201 of the second flat reflector, and the fourth sub-rotating part 622 is rotationally connected to the second end 12102 of the second display panel.

Specifically, the third sub-rotating part 621 and the fourth sub-rotating part 622 may be biaxial rotators or other rotating mechanical structures, which are not limited here.

Specifically, the second display panel 121 and the second flat reflector 122 can be rotated to adjust a relative positional relationship between the second floating image 201 and the first floating image 101, including adjusting the display depth, adjusting the display position, etc. Different display effects can be achieved by dynamically adjusting the display distance between the first floating image 101 and the second floating image 201 to change the state of image fusion.

In some embodiments, the second display module 200 has a third state and a fourth state. In the third state, the second flat reflector 122 is located at a fifth position, and the second display panel 121 is located at a sixth position. In the fourth state, the second flat reflector 122 is located at a seventh position, and the second display panel 121 is located at an eighth position. An included angle between the eighth position and the sixth position is twice an included angle between the seventh position and the fifth position.

Specifically, the second flat reflector 122 and the second display panel 121 rotate in a same direction, the included angle between the eighth position and the sixth position is β2, the included angle between the seventh position and the fifth position is α2, and β2 is twice as large as α2.

Specifically, both the second flat reflector 122 and the second display panel 121 rotate clockwise or counterclockwise, and the rotation angle β2 of the second display panel 121 is twice the rotation angle α2 of the second flat reflector 122, which can keep the size of the second floating image 201 unchanged and only change its position.

Further, the first flat reflector 112, the first display panel 111, the second flat reflector 122, and the second display panel 121 rotate in the same direction.

Further, the rotation angle of the first display panel 111 being equal to the rotation angle of the second display panel can synchronously adjust the positions of the first floating image 101 and the second floating image 201, thereby allowing the fused three-dimensional image to have an excellent display effect.

In this embodiment, further, the rotation angle β1 of the first display panel 111 is greater than 0 and less than 90 degrees, and the rotation angle α1 of the first flat reflector 112 is greater than 0 and less than 45 degrees; and/or the rotation angle β2 of the second display panel 121 is greater than 0 and less than 90 degrees, and the rotation angle α2 of the second flat reflector 122 is greater than 0 and less than 45 degrees. According to this implementation method, a small rotation of the first display panel 111 and the first flat reflector 112 can be realized, and the first floating image 101 can obtain a larger displacement distance; and/or a small rotation of the second display panel 121 and the second flat reflector 122 can be realized, and the second floating image 201 can obtain a larger displacement distance.

Further, in a preferred embodiment, the first retroreflective component 21 is parallel to the first display panel 111, the second retroreflective component 22 is parallel to the second display panel 121, and the first retroreflective component 21 is perpendicular to the second retroreflective component 22. At this time, the first flat reflector 112, the first display panel 111, the second flat reflector 122, and the second display panel 121 rotate in the same direction, which can better adjust the relative positional relationship between the first floating image 101 and the second floating image 201, thereby facilitating fusion into a three-dimensional image.

In this embodiment, by mechanical rotation of components in the three-dimensional display device 1000, a certain floating distance change can be achieved, so that the three-dimensional image can have a greater display depth. In addition, different display effects can be achieved by dynamically adjusting the display distance between the first floating image 101 and the second floating image 201 to change the state of image fusion.

It should be noted that in the three-dimensional display device 1000 of any one of the embodiments, by adjusting the brightness of the first display panel 111, the brightness of the second display panel 121, a preset position of the first display panel 111, and a preset position of the second display panel 121, images with different front and rear positions and different brightness of the first floating image 101 and the second floating image 201 can be obtained for deep fusion.

It should be noted that in the three-dimensional display device 1000 of any one of the embodiments, the brightness of floating images can be adjusted or controlled by adjusting or presetting the first light splitting component 31 and second light splitting component 32 with different ratios of transmission and reflection. For example, when a transmittance of the first light splitting component 31 is 50% and a reflectivity is 50%, and a transmittance of the second light splitting component 32 is 75% and a reflectivity is 250%, a brightness of the obtained image after fusion is 18.75% of an initial brightness of the first display light source 11 or the second display light source 12.

The three-dimensional display device provided by the embodiments of the present disclosure is described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A three-dimensional display device, comprising:
a first display module comprising a first display light source, a first retroreflective component, and a first light splitting component, wherein display light emitted by the first display light source exits the first light splitting component and forms a first floating image; and
a second display module comprising a second display light source, a second retroreflective component, and a second light splitting component, wherein display light emitted by the second display light source exits the second light splitting component and forms a second floating image;
wherein one end of the first light splitting component abuts one end of the second light splitting component, an included angle between a plane where the first light splitting component is located and a plane where the second light splitting component is located is greater than 0 and less than or equal to 90 degrees, and the first floating image and the second floating image partially overlap;
wherein a first end of the first display light source abuts a first end of the first retroreflective component, a second end of the first display light source abuts a first end of the first light splitting component, a second end of the first retroreflective component abuts a second end of the first light splitting component, and the first display light source and the first retroreflective component are nonparallel to the first light splitting component; and
wherein a first end of the second display light source abuts a first end of the second retroreflective component, a second end of the second display light source abuts a first end of the second light splitting component, a second end of the second retroreflective component abuts a second end of the second light splitting component, and the second display light source and the second retroreflective component are nonparallel to the second light splitting component.

2. The three-dimensional display device of claim 1, wherein the first display light source comprises a first display panel, and the second display light source comprises a second display panel.

3. The three-dimensional display device of claim 2, wherein the first end of the first light splitting component abuts the first end of the second light splitting component.

4. The three-dimensional display device of claim 3, wherein display light emitted by the first display panel is converted by the first light splitting component, the first retroreflective component, the first light splitting component, and the second light splitting component sequentially to form the first floating image; and display light emitted by the second display panel is converted by the second light splitting component, the second retroreflective component, and the second light splitting component sequentially to form the second floating image.

5. The three-dimensional display device of claim 3, wherein a length of the first light splitting component is greater than or equal to a length of the first retroreflective component, and the length of the first retroreflective component is greater than or equal to a length of the first display panel; and a length of the second light splitting component is greater than or equal to a length of the second retroreflective component, and the length of the second retroreflective component is greater than or equal to a length of the second display panel.

6. The three-dimensional display device claim 5, wherein the first display panel is perpendicular to the first retroreflective component; and the second display panel is perpendicular to the second retroreflective component.

7. The three-dimensional display device of claim 6, wherein the first display panel is parallel to the second retroreflective component.

8. The three-dimensional display device of claim 1, wherein both the first light splitting component and the second light splitting component are beam-splitter mirrors, and both the first retroreflective component and the second retroreflective component are retroreflective films.

9. The three-dimensional display device of claim 2, wherein both the first light splitting component and the second light splitting component are beam-splitter mirrors, and both the first retroreflective component and the second retroreflective component are retroreflective films.

10. The three-dimensional display device of claim 1, wherein both the first light splitting component and the second light splitting component are reflective polarizers; the first retroreflective component comprises a first retroreflective film and a first quarter-wave plate, and the first quarter-wave plate is disposed on one side of the first retroreflective film adjacent to the first light splitting component; and the second retroreflective component comprises a second retroreflective film and a second quarter-wave plate, and the second quarter-wave plate is disposed on one side of the second retroreflective film adjacent to the second light splitting component.

11. The three-dimensional display device of claim 2, wherein both the first light splitting component and the second light splitting component are reflective polarizers; the first retroreflective component comprises a first retroreflective film and a first quarter-wave plate, and the first quarter-wave plate is disposed on one side of the first retroreflective film adjacent to the first light splitting component; and the second retroreflective component comprises a second retroreflective film and a second quarter-wave plate, and the second quarter-wave plate is disposed on one side of the second retroreflective film adjacent to the second light splitting component.

12. The three-dimensional display device of claim 1, wherein the first display light source comprises a first display panel and a first flat reflector, and the first display panel, the first flat reflector, the first light splitting component, and the first retroreflective component abut to each other in sequence by end-to-end; and the second display light source comprises a second display panel and a second flat reflector, and the second flat reflector, the second display panel, the second retroreflective component, and the second light splitting component abut to each other in sequence by end-to-end.

13. The three-dimensional display device of claim 12, wherein a first end of the first flat reflector abuts a first end of the first light splitting component, a first end of the second retroreflective component abuts a first end of the second light splitting component, and the first end of the first light splitting component abuts the first end of the second light splitting component.

14. The three-dimensional display device of claim 13, wherein display light emitted by the first display panel is converted by the first flat reflector, the first light splitting component, the first retroreflective component, the first light splitting component, and the second light splitting component sequentially to form the first floating image; and display light emitted by the second display panel is converted by the second flat reflector, the second light splitting component, the second retroreflective component, and the second light splitting component sequentially to form the second floating image.

15. The three-dimensional display device of claim 13, wherein a length of the first light splitting component is greater than or equal to a length of the first retroreflective component, the length of the first retroreflective component is greater than or equal to a length of the first flat reflector, and the length of the first flat reflector is greater than or equal to a length of the first display panel; and a length of the second light splitting component is greater than or equal to a length of the second retroreflective component, the length of the second retroreflective component is greater than or equal to a length of the second flat reflector, and the length of the second flat reflector is greater than or equal to a length of the second display panel.

16. The three-dimensional display device of claim 15, wherein the first retroreflective component is parallel to the first display panel, the second retroreflective component is parallel to the second display panel, and the first retroreflective component is perpendicular to the second retroreflective component.

17. The three-dimensional display device of claim 15, wherein a second end of the first flat reflector abuts a first end of the first display panel;

the first display module further comprises a first sub-rotating part and a second sub-rotating part, the first sub-rotating part is rotationally connected to the second end of the first flat reflector, and the second sub-rotating part is rotationally connected to the first end of the first display panel;

the first display module has a first state and a second state;

in the first state, the first flat reflector is located at a first position, and the first display panel is located at a second position;

in the second state, the first flat reflector is located at a third position, and the first display panel is located at a fourth position; and an included angle between the fourth position and the second position is twice an included angle between the third position and the first position.

18. The three-dimensional display device of claim 16, wherein a second end of the first flat reflector abuts a first end of the first display panel;

the first display module further comprises a first sub-rotating part and a second sub-rotating part, the first sub-rotating part is rotationally connected to the second end of the first flat reflector, and the second sub-rotating part is rotationally connected to the first end of the first display panel;

the first display module has a first state and a second state;

in the first state, the first flat reflector is located at a first position, and the first display panel is located at a second position;

in the second state, the first flat reflector is located at a third position, and the first display panel is located at a fourth position; and an included angle between the fourth position and the second position is twice an included angle between the third position and the first position.

19. The three-dimensional display device of claim 17, wherein a second end of the second display panel abuts a first end of the second flat reflector;

the second display module further comprises a third sub-rotating part and a fourth sub-rotating part, the third sub-rotating part is rotationally connected to the first end of the second flat reflector, and the fourth sub-rotating part is rotationally connected to the second end of the second display panel;

the second display module has a third state and a fourth state;

in the third state, the second flat reflector is located at a fifth position, and the second display panel is located at a sixth position;

in the fourth state, the second flat reflector is located at a seventh position, and the second display panel is located at an eighth position; and an included angle between the eighth position and the sixth position is twice an included angle between the seventh position and the fifth position.

20. The three-dimensional display device to claim 18, wherein a second end of the second display panel abuts a first end of the second flat reflector;

the second display module further comprises a third sub-rotating part and a fourth sub-rotating part, the third sub-rotating part is rotationally connected to the first end of the second flat reflector, and the fourth sub-rotating part is rotationally connected to the second end of the second display panel;

the second display module has a third state and a fourth state;

in the third state, the second flat reflector is located at a fifth position, and the second display panel is located at a sixth position;

in the fourth state, the second flat reflector is located at a seventh position, and the second display panel is located at an eighth position; and an included angle between the eighth position and the sixth position is twice an included angle between the seventh position and the fifth position.

* * * * *